Oct. 26, 1971  D. P. GELLERT  3,615,064
TWO STRING KITE AND CONTROL THEREFOR
Filed July 5, 1968  2 Sheets-Sheet 1

INVENTOR.
DONALD P. GELLERT
BY *James and Franklin*
ATTORNEYS

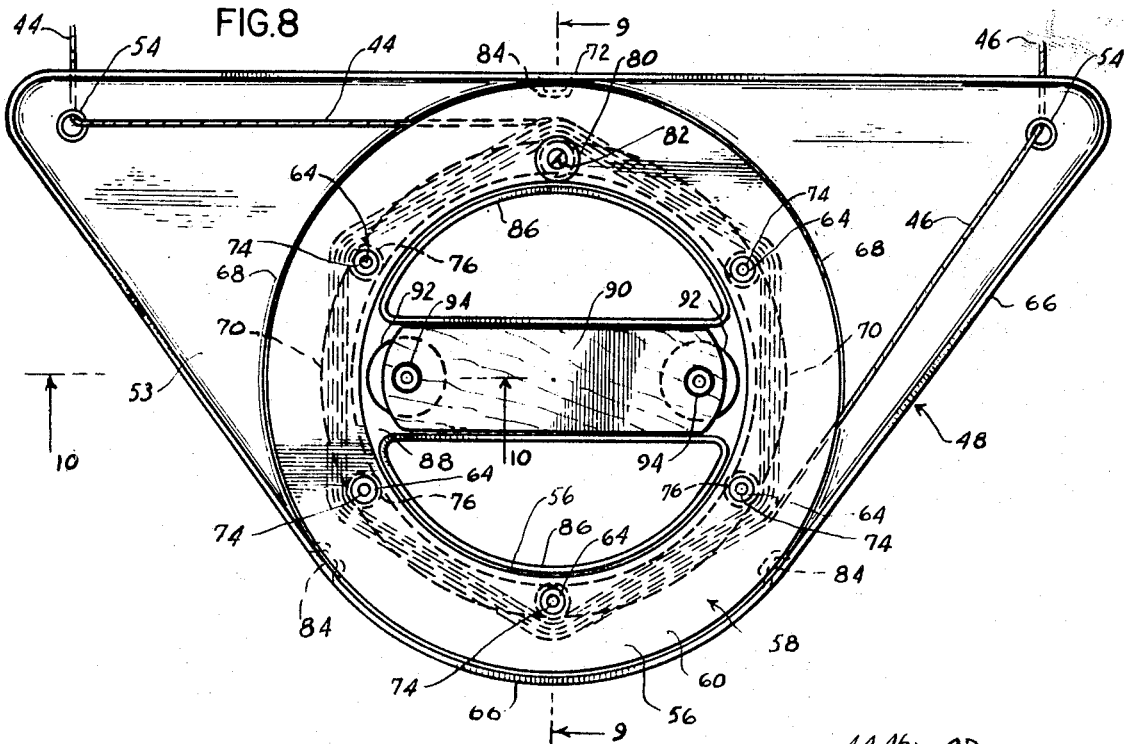
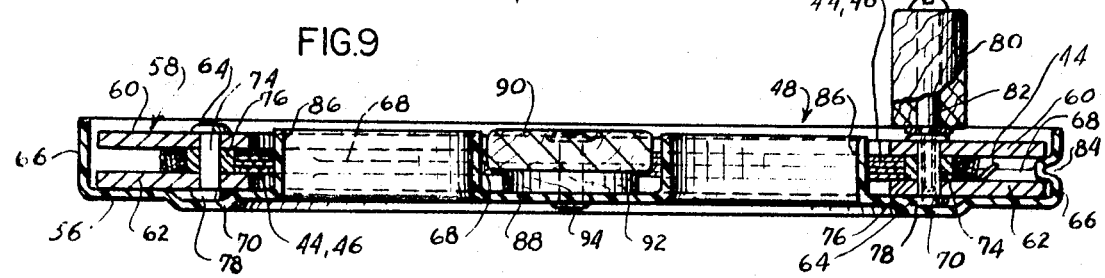
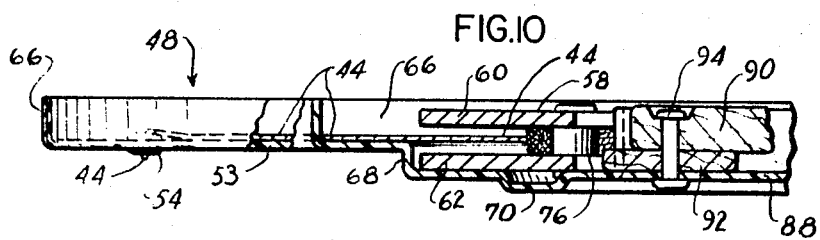
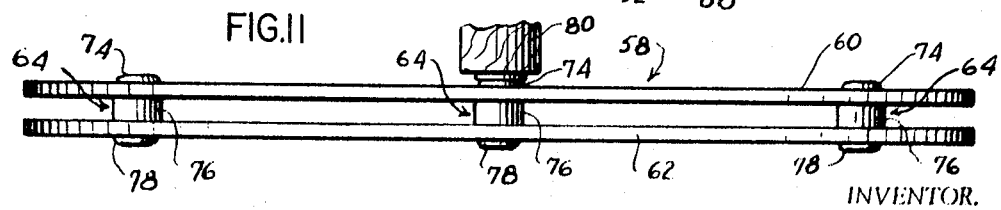

United States Patent Office 3,615,064
Patented Oct. 26, 1971

3,615,064
TWO STRING KITE AND CONTROL THEREFOR
Donald P. Gellert, St. Thomas, Virgin Islands, assignor to U.S.M. Precision Products Inc.
Filed July 5, 1968, Ser. No. 742,687
Int. Cl. A63h 27/08; B64c 31/06; B65h 75/38
U.S. Cl. 242—96                                    11 Claims

ABSTRACT OF THE DISCLOSURE

A kite comprises a flexible sheet carrying a central rigid member and two spar members spaced from the rigid member, a resilient wire extending between the two spar members to spread the spar members apart so as to maintain tautness of the sheet. A pair of kite strings is operatively connected to the kite, one of said strings being in operative connection with each one of said spar members, whereby controlled movement of the kite strings produces relative movement of one of the spar members with respect to the rigid member, thereby varying the effective area of one section of the sheet, thereby to cause controlled guidance of the kite. Also, disclosed is a remote, hand held control device from which the two kite strings are released from two spaced points thereon, a handle being provided to the rear of these spaced release points. A reel carried by the control device, upon which the two kite strings are wound, is of relatively large diameter and has a very narrow drum portion, whereby the two kite strings wound thereon lie uniformly about the drum portion.

---

The present invention relates to a kite construction and particularly to a kite in which control is effected by two strings operatively connected to the kite. The present invention further relates to a control and guidance element and a reel specially adapted for use with a two string kite.

Several attempts have been made in the past to build and fly kites which are operated and controlled by two kite strings in an effort to achieve improved control of the movement of that kite. These two-string kites in one of these previous embodiments, comprised two keels each of which had one of the strings connected thereto. It was found, however, that when this kite turned over, due to a sudden change in wind direction or wind velocity, the keels were brought together and the kite would fall. Other two-string kites which have been constructed in the past were complex and costly and included drums and clutches to operate a rudder and elevator provided on the kite which were selectively operated to achieve control of the kite's movement.

The improved operation of the kite which may be obtained by means of two string operation has indicated the desirability of developing a kite of this type which is reliable in operation and relatively simple and inexpensive to construct.

The two-string kites further require the use of a control device, which is preferably held by the user, from which the two strings are released and retracted and by means of which the kite is controlled as to its direction and nature of movement. In the prior art embodiments, there have been problems in providing a control device in which the two strings departed from spaced points, the handle of the control device usually comprising a stick extending between these two spaced points. It was, however, found that the necessary control of the kite was excessively critical in that slight movement of the stick resulted in radical changes in the motion of the kite. Thus, control of the two string kite was very difficult and required the exercise of great skill by the user. A further problem found in the early attempts at two string kite construction, was the difficulty in winding the two strings on a reel member as it was often found that the two strings would tend to arrange themselves non-uniformly and would tend to bunch about the periphery of the reel drum. The kite strings would thus unwind from the reel in unequal lengths, thereby causing undesired differential in the tensions on the strings and thus cause undesired changes in the kite's performance.

It is, therefore, a general object of the present invention to provide a two string kite construction in which the above described problems and difficulties of the earlier attempts at constructing and operating kites of this type have been largely overcome.

It is yet a further object of the present invention to provide a two string kite in which the elements from which the kite is formed are relatively inexpensive and simple to construct.

It is still a further object of the present invention to provide a two string kite control device in which accuracy and reliability of control can be achieved and which control is effective in normally insufficient and/or excessive wind conditions in which the kite is flown.

It is another object of the present invention to provide a control device for use in combination with a two string kite, in which accurate control can be readily achieved and in which the release of the two strings from spaced locations on the control device to the kite is reliable, and which is formed from a minimum of inexpensive and readily formed components.

To these ends, the present invention relates to a kite construction in which the kite is formed of a flexible sheet upon which a rigid member and two spaced spar members are operatively secured, thereby defining two wind-receiving areas on the sheet. A resilient member is operatively connected between the spar members to maintain tautness of the sheet. Guidance means, including two spaced, substantially parallel kite strings, are operatively connected one to each of the spar members so that the controlled movement of the kite strings causes relative movement of one of the spar members with respect to the rigid member so as to vary the relative wind receiving areas of the sheet, thereby to produce controlled change in the direction and performance of the kite.

The kite strings are connected to the spar members and also to the rigid member through a pair of bridles, each bridle being connected to one of the spar members and to the rigid member. The resilient member is in the form of a wire received in an opening formed in the ends of the spar members. The flexible sheet is preferably substantially triangular in shape, the rigid member lying substantially along the median of that triangle so defined, and the spar members lie along the opposite legs of that triangle, the resilient wire being received in the spar members at the ends thereof nearest the apex of the triangle. The end of the rigid member remote from that apex extends beyond the sheet, that remote end having the ends of the bridles operatively connected thereto.

The invention also provides a control device for use with a two string kite of the type described above, from which the two strings depart from spaced locations, a handle being provided to the rear of these locations. In this manner the movement of the control device by the user more accurately guides and moves the kite, the response of the kite to this movement being substantially less sensitive than that obtained when the control handle is substantially colinear with the points from which the strings leave the control device. The two elongated kite strings are wound around a reel carried by the control member, said reel having a very narrow drum portion as compared to the reel diameter, so that equal lengths of both kite strings are wound in a substantially uniform manner about the reel. The control device is formed with wall portions which limit and/or guide the rotational movement of the string carrying reel.

To the accomplishment of the above, and to such other objects as may hereinafter appear, the present invention relates to the design and manner of operation of a two string kite and a control device adapted to be used with a two string kite as defined in the accompanying claims and as described in this specification, taken together with the accompanying drawings in which:

FIG. 8 is a bottom plan view of the control device of FIG. 7;

FIG. 9 is a cross-sectional view taken approximately on the line 9—9 of FIG. 8;

FIG. 10 is a cross-sectional view taken approximately on the line 10—10 of FIG. 8; and FIG. 11 is a side elevation of the reel carried by the control device of FIG. 7, without the two kite strings.

Figure 1:
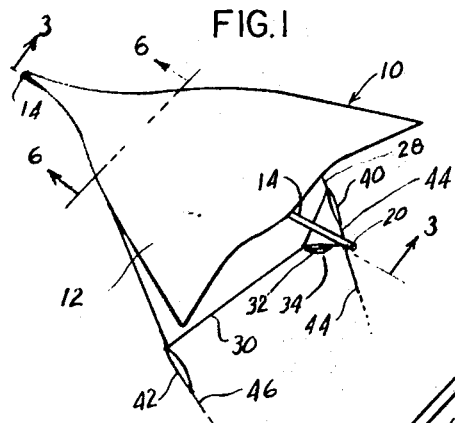
FIG. 1 is a perspective view of a two string kite according to this invention.
Figure 2:
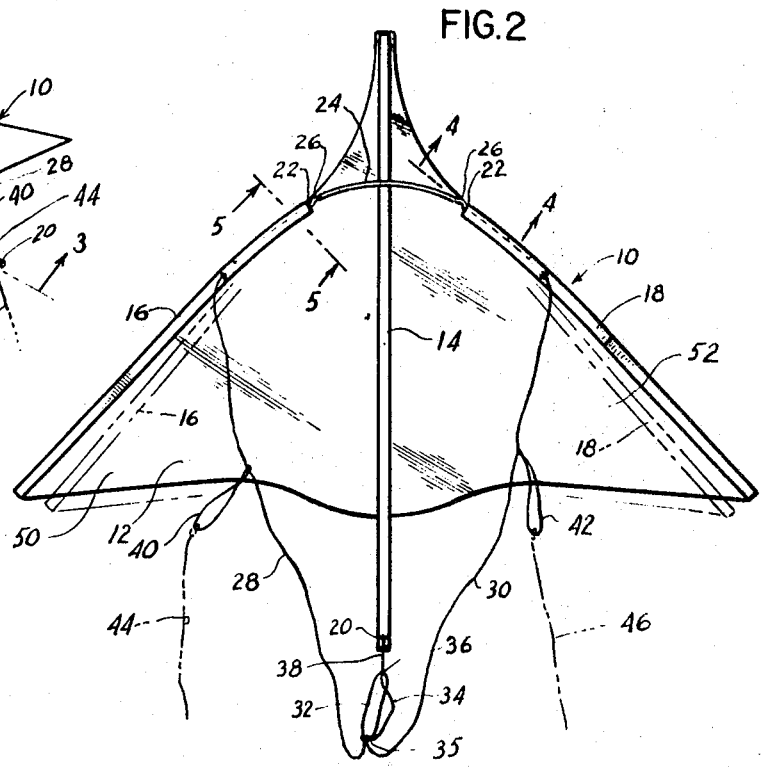
FIG. 2 is a bottom plan view of the kite of FIG. 1.
Figure 3:
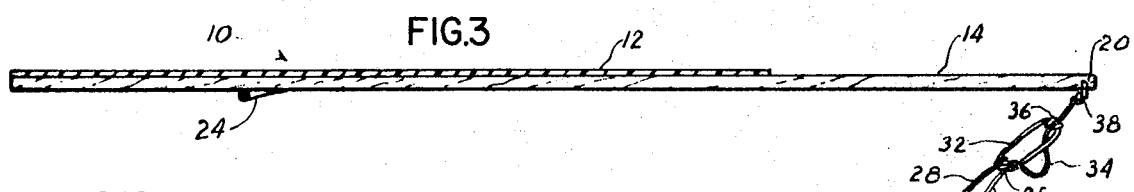
FIG. 3 is a cross-sectional view taken approximately on the line 3—3 of FIG. 1.
Figure 6:
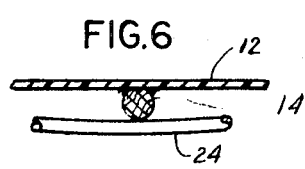
FIG. 6 is a cross-sectional view taken approximately on the line 6—6 of FIG. 1.
Figure 4:
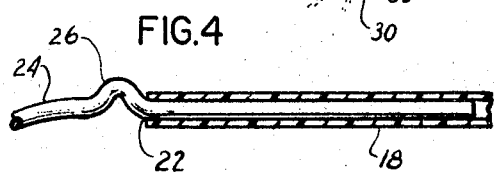
FIG. 4 is a cross-sectional view taken approximately on the line 4—4 of FIG. 2.
Figure 5:
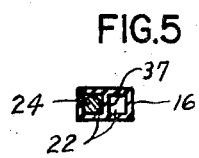
FIG. 5 is a cross-sectional view taken approximately on the line 5—5 of FIG. 2.

A two-string kite generally designated 10 is illustrated in FIGS. 1–6 and as shown, comprises a flexible, substantially triangular sheet 12 to which a central rigid member or longeron 14, and a pair of spar members 16 and 18 are secured by means such as gluing. As seen best in FIG. 2, longeron 14 extends from the apex of the triangular sheet 12 at one end, and at its other end extends beyond the sheet 12 and defines thereat a free end designated 20. Openings 22 are provided in the ends of spar members 16 and 18 located nearest to the apex of sheet 12, and these openings each receive one end of a resilient wire 24, wire 24 being offset as shown at 26 (FIG. 4) spaced from its ends so as to limit the extent of the insertion of wire 24 into the openings 22 of spar members 16 and 18. The resilient wire 24 is effective to spread the spar members 14 and 16 away from one another thereby causing the sheet 12 to remain substantially taut. The insertion of the ends of wire 24 into openings 22 causes wire 24 to be bowed over its length intermediate the spar members.

A pair of bridles 28 and 30 are connected to spar members 16 and 18 respectively, and are operatively connected to end 20 of longeron 14. The manner of the connection of bridles 28 and 30 to longeron 14 is shown best in FIG. 3 wherein the ends of bridles 28 and 30 are connected to a stretchable member such as a rubber band 32, and a string 34 is secured to a point 35 on rubber band 32 to which bridles 28, 30 are connected at a point 36, and then to a metal loop 38 passing through end 20 of longeron 14. In this manner, the stretchable connection between the bridles 28 and 30 and longeron 14 provided by rubber band 32 is able to absorb a sudden force on bridles 28 and 30 and thus prevents a sudden pull on bridles 28 or 30 from damaging longeron 14. The length of string 34 is greater than the length of rubber band 32 in its unstretched condition so that the band can stretch, but in the event of the breaking of rubber band 32, bridles 28 and 30 will still be connected to longeron 14 by string 34. Loops 40 and 42 are provided on bridles 28 and 30 respectively, and are adapted to have fastened thereto the ends of two elongated kite strings 44 and 46 respectively, which extend from a control device 48 carried by the user, that control device being described in greater detail below.

In an exemplary construction of kite 10, sheet 12 was formed of a .003" thick sheet of polyvinyl chloride, and the spar members 16 and 18 which are semi-rigid and theoretically could be rigid in construction, were formed from an extrusion of polyvinyl chloride having little or no plasticizer added thereto so as to reduce the flexibility of the spar members. As a result of this extrusion forming process, the openings 22 extend through the entire axial length of spar members 16 and 18 although this is not essential to the operation of kite 10 and is primarily a result of the extrusion process by which spar members 16 and 18 were formed. As seen best in FIG. 5, there are two parallel co-extensive openings formed in spar members 16 and 18, these openings being separated by a dividing wall 37. The end of wire 24 extends into only one of these openings. An extrusion with a single passage could also be employed.

It will be noted that the central rigid member or longeron 14 divides sheet 12 into two substantially equal area sections 50 and 52. In the operation of kite 10, the pivotal movement of the control device 48 by the user, produces a difference in the tensions on the two kite strings 44 and 46 and thus on the bridles 28 and 30 to which they are attached. This latter difference in tension is applied to the spar members 16 and 18 causing the relative movement of one of the spar members 16 and 18 with respect to longeron 14. When such relative movement occurs, the surface area of one of the sheet sections 50 and 52 is changed relative to the other sheet section. Thereby, the effective wind receiving areas of the two sheet sections is modified producing a force differential on the two sections of sheet 12, and thus a change in the direction or nature of movement of kite 10.

Figure 7:
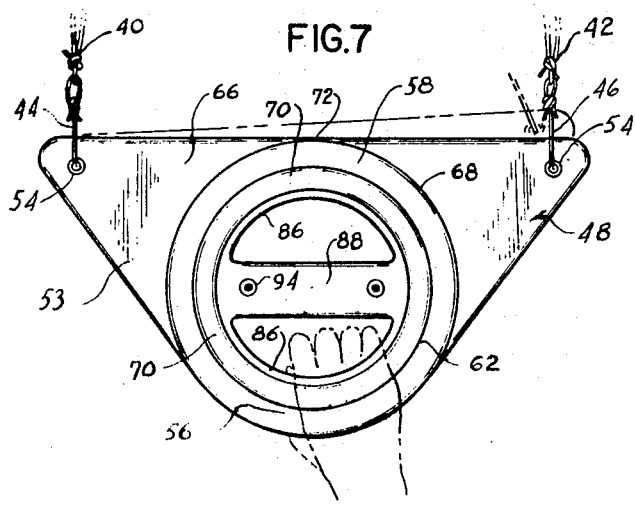
FIG. 7 is a plan view of a control device which is operatively connected to the kite of FIG. 1 and which is utilized to control the motion of that kite.

The control device 48, connected to kite 10 via strings 44 and 46 is illustrated in FIGS. 7–11, and comprises a substantially triangular plate 53 vacuum formed from a plastic sheet to produce its desired form. Kite strings 44 and 46 leave control device 48 from a pair of spaced eyelets 54 located at opposite ends of the base of triangular plate 53. A handle portion of control device 48 generally designated as 56, is provided at the arcuate surface defined near the apex of triangular plate 53 and is thus located substantially to the rear of eyelets 54. It has been found that by so positioning the handle with respect to the string departure points, greater sensitivity of control may be achieved by pivoting the control device 48 about the handle 56, than in a control device in which the control handle is arranged substantially colinear with the string departure points.

The two kite strings 44 and 46 are wound about a rotatable reel 58 which is formed of two large diameter rigid disc members 60 and 62 having a relatively narrow drum provided therebetween, that narrow drum, as herein specifically disclosed, being defined by a plurality of spacers 64 arranged intermediate discs 60 and 62, which, as herein shown, are six in number. The vertical dimension of spacers 64 is considerably less than the diameter of discs 60 and 62 so that the drum of reel 58 is very narrow relative to the diameter of discs 60 and 62. It has been found that by forming reel 58 in this manner, that is, with the narrow drum, the two kite strings are wound about spacers 64 in a substantially equal or uniform manner and therefore, do not bunch together about the drum portion so as to unwind from reel 58 in unequal lengths, when the thickness of the strings is substantially negligible as compared to the diameter of the discs. In one exemplary construction of reel 58, the discs 60 and 62 were formed of 1/8 inch thick, 8 inch diameter Masonite, spaced 1/4 inch from one another by means of spacers 64.

Plate 53 is provided with a peripheral wall 66, and an annular riser 68. An annular channel 70 is formed in the bottom wall of plate 53 (FIG. 10). That portion of peripheral wall 66 located near handle 56, that is near the apex of triangular plate 53, serves to limit the radial movement of reel 58 as shown best in FIG. 9. Further limitation of radial movement of reel 58 is provided by that portion of peripheral wall 66 located at the base of the triangle defined by plate 53 as shown at 72 of FIG. 8. Further constraint of the radial movement of reel 58 is provided by the annular riser 68, which as shown in FIG. 10, is directly adjacent to the edge of lower disc 62 about substantially the entire circumference of that disc. Spacers 64 are, as herein shown, in the form of rivets or eyelets 74 surrounded in the space between discs 60 and 62 by a sleeve 76, the low head 78 of rivets 74 extending into the channel 70 so that as reel 58 is rotated, head 78 rides along channel 70 so as to guide reel 58 along its predetermined circular path defined by channel 70.

Manual rotation of reel 58 may be effected when desired, by the turning of a knob 80 which is operatively secured to one of the spacers 64 by means of a shouldered screw 82, threadedly engaging the interior of a bore formed within one of the rivets or eyelets 74.

It will be seen that reel 58 is carried on an open face on plate 53 so that means are required to prevent reel 58 from falling out of plate 53. To this effect, indentations 84 are formed in the peripheral wall 66 and extend into the region between the upper and lower discs 60 and 62 of reel 58, thereby to reliably retain the reel 58 within the upper open face of triangular plate 53.

The inner portion of plate 53 is provided with a pair of arcuate walls 86 which define an inner radial limit for reel 58. Thus, the rotational path of reel 58 is reliably controlled by head 78 riding along channel 70, and limited radially by walls 66 and 86, riser 68 and channel 70 all of which are integrally formed in triangular plate 53. Normally the edges of discs 62 and 64 of the rotating reel 58 do not engage the limiting members, namely walls 66 and 86 and riser 68, due to the guidance of reel 58 along its circular path in channel 70. No central pivot is thus required for the controlled rotation of reel 58.

The arcuate regions defined by walls 86 are separated by a transverse web 88 which acts as a central bridge member or handle for control device 48. To provide a handle having a suitable thickness for comfortable holding, the central handle is completed by securing a filler bar 90 to web 88, and where required, spacers such as 92 may be interposed between web 88 and filler bar 90 to achieve the desired thickness of the central handle, the entire central handle assembly being secured together by means of rivets 94.

The manner of operation of the control device 48 in cooperation with the two string kite 10 is now believed to be apparent. The two strings 44 and 46 are wound in the same direction about the drum portion of reel 58 as defined by the spacers 64. String 44 (FIG. 8) extends from around the reel 58 and passes through eyelet 54 at the left side of plate 53 and is thereafter fastened to loop 40 of bridle 28. String 46 passes from reel 58 through eyelet 54 at the right hand end of plate 53, and extends therefrom until it is fastened to loop 42 of bridle 30. If the wind is sufficiently strong it will pull kite 10 away from control device 48, thereby unwinding equal lengths of strings 44 and 46 from reel 58. If the breeze is insufficient to operate kite 10 in this manner, the strings may be unwound from reel 58 by rotating knob 80 in the proper direction. During this unwinding process, or when string is taken in by turning reel 58 in the opposite direction, the user would preferably hold control device 48 by placing his hand around the central handle 88, 90. When controlled operation of the kite 10 is desired and the strings are being unwound by the outward pull of kite 10 on these strings, the user will hold the control device 48 at the rearward handle 56, and brake or stop the unwinding strings merely by pressing his fingers tightly up against the exposed bottom portion of reel 58. Furthermore, by pivoting or tilting the control device 48 about either its transverse or longitudinal axis while it is held at rear handle 56, the tension on the strings 46 and 48, which is normally the same, now becomes different. For example, when control device 48 is pivoted to the position shown in the broken line in FIG. 7, the tension on string 44 will exceed the tension on string 46. As a result the tension developed at spar member 16 will exceed that on spar member 18, causing spar member 16 to move towards longeron 14 to the position 16' shown in the broken line in FIG. 2, thereby to reduce the effective wind receiving area of sheet portion 50. Consequently, the effective wind receiving area of sheet portion 52 will exceed that of the reduced area portion 50 causing the kite 10 to move in a counterclockwise direction as viewed in FIG. 2. Conversely, pivoting control device 48 in an opposite direction will move spar member 18 to the broken line position 18' and so provide an opposite or clockwise movement of the kite 10.

By proper operation of the control device 48, kite 10 can be made to perform banks, that is steer to the side, the kite may be moved slowly in a large circle or made to spin in a number of controlled rotations. Furthermore, the kite can be controlled safely and reliably in relatively high winds up to 40 knots or more since it is effectively self reefing, that is, its wind-receiving area is automatically reduced in a strong wind. As a result of the precise control which can be effected on kite 10, it can be made to hover at ground or water level or at any desired height. Complete control of the altitude and attitude of the kite can be effected, and as the kite material is not damaged by water, it can be dived into the water and can then take off from the water. The kite is preferably launched by allowing the wind or breeze to pull the kite outwards, thereby unwinding the kite strings, the control device 48 being held at handle 56 in one hand. The rate at which kite strings 44 and 46 unwind from reel 53 may be braked by applying manual pressure to the unwinding strings and the movement of the kite is controlled merely by pivoting the control device.

Thus, a reliable and easily operable and controllable two string kite along with an effective control device therefor has been herein disclosed, the control device including a rotatable reel upon which both of the kite strings are wound in a uniform manner for storage. The kite can be used to perform a great variety of interesting movements in wind conditions at which conventional kites could not be controlled. This construction is made of a small number of relatively inexpensive components and is thus within the means of all.

While only a single embodiment of this invention has been herein specifically disclosed, it will be apparent that the details of the disclosed kite construction may be varied without departing from the present invention as sought to be defined in the following claims.

I claim:

1. A device for controlling of the movement of a kite adapted to be operated at a distance from the said device comprising a base plate, a reel on said base plate for storing thereon a pair of elongated kite strings adapted to be operatively connected to guidance elements on said kite, said pair of elongated kite strings being wound in the same direction about said reel, said reel being normally freely rotatably mounted on said base plate thereby to unwind said strings from said reel in response to the pull of said kite on said strings, means for releasing said strings from said base plate at two spaced points thereon, first handle means on said base plate adapted to be gripped and effective to support said base plate and said reel in its freely rotatable mounting, and second handle means on said base plate adapted to be grasped in a manner such that the rotation of said reel may be directly controlled by the hand of the operator, both said first and second handle means being arranged behind the line defined by said two points and extending a substantial distance in the direction of said line to allow for the application of a torque thereon to rotate said base plate thereby to control the relative tension on said strings.

2. The control device of claim 1, in which said plate comprises a peripheral wall, spaced sections of said wall defining outer limiting means for said reel.

3. The control device of claim 1 wherein said plate is approximately triangular in shape, said points being located adjacent the base thereof, said first handle means being located near the central portion of said base plate and said second handle being located near the apex of said base plate.

4. The control device of claim 3 wherein said first and second handle means are formed integral with said base plate.

5. The control device of claim 1, further comprising means operatively connected to said reel, for rotating said reel thereby to wind and unwind said strings on said reel.

6. The control device of claim 5, in which said reel comprises a pair of rigid disc members, and spacing means having a vertical dimension substantially less than the diameter of said disc members positioned between said disc members, said spacing means thereby defining a narrow drum between said disc members about which said two kite strings are wound, whereby both of said kite strings are uniformly wound about the periphery of said drum in a single narrow channel defined between said discs.

7. The control device of claim 6, in which said base plate has an annular channel formed therein, a portion of said spacing means extending beyond one of said disc members and adapted to travel along said channel when said reel is rotated, thereby defining bearing and guiding means for said reel.

8. The control device of claim 6, in which said base plate includes an annular wall arranged about a portion of said reel, said wall having a diameter slightly greater than the diameter of said disc members, said wall cooperating with at least one of said disc members, thereby to define outer limiting means for said reel.

9. The control device of claim 8 in which said base plate further comprises a second annular wall located radially, inwardly from said first mentioned annular wall, and defining inner limiting means for said reel, the portion of said base plate defined between said first and second annular walls adapted to be grasped so as to comprise said second handle means.

10. The control device of claim 9, in which said second annular wall comprises two annular wall sections separated from one another by a central bridge member, said bridge member serving as said first handle means.

11. The control device of claim 8, in which said reel is carried in an open face of said device, said annular wall comprising a plurality of indentations extending into the space between said disc members of said reel, thereby to prevent said reel from escaping from said open face of said device.

References Cited

UNITED STATES PATENTS

| | | | |
|---|---|---|---|
| 1,269,466 | 6/1918 | Lemassena | 242—84.8 |
| 2,615,649 | 10/1952 | Flewelling | 242—96 X |
| 2,745,608 | 5/1956 | Walker | 242—100.1 |
| 3,355,129 | 11/1967 | Kinsey | 242—100.1 X |

GEORGE F. MAUTZ, Primary Examiner

U.S. Cl. X.R.

242—100.1; 244—153, 155